United States Patent [19]

Mitsuyama

[11] Patent Number: 5,732,822
[45] Date of Patent: Mar. 31, 1998

[54] COMMODITY ANTITHEFT IMPLEMENT

[76] Inventor: Masuhiro Mitsuyama, 1071, Kinugasa, Wake-cho, Wake-gun, Okayama, Japan

[21] Appl. No.: 621,793

[22] Filed: Mar. 28, 1996

[30] Foreign Application Priority Data

Mar. 31, 1995 [JP] Japan ................................. 7-76327

[51] Int. Cl.⁶ ................................................. B65D 85/672
[52] U.S. Cl. ........................ 206/387.11; 206/1.5; 206/807
[58] Field of Search ............................... 206/387.11, 1.5, 206/387.1, 307, 807, 308.2; 70/387, 57, 57.1, 58

[56] References Cited

U.S. PATENT DOCUMENTS 4,285,429  8/1981  MacTavish .................. 206/1.5
4,567,983  2/1986  Morris ..................... 206/387.11
4,799,370  1/1989  Cooper ........................ 70/57
5,375,712  12/1994  Weisburn ................. 206/387.11

Primary Examiner—Jacob K. Ackun
Attorney, Agent, or Firm—Wenderoth, Lind & Ponack

[57] ABSTRACT

A case storing therein a commodity is made to be only difficultly opened, so that a theft of only the commodity inside the case is prevented. Around a case storing therein a commodity, a blocking member for preventing the case from being opened is slidably fitted thereon. The case is provided with a locking pawl that is caught by the blocking member and is able to be thrust inward, so that the blocking member is mounted to the case while being unable to slide by an engagement between the blocking member and the locking pawl of the case. With this arrangement, the case is made to be only difficultly opened so as to prevent the occurrence of a theft unless the blocking member is removed.

8 Claims, 18 Drawing Sheets

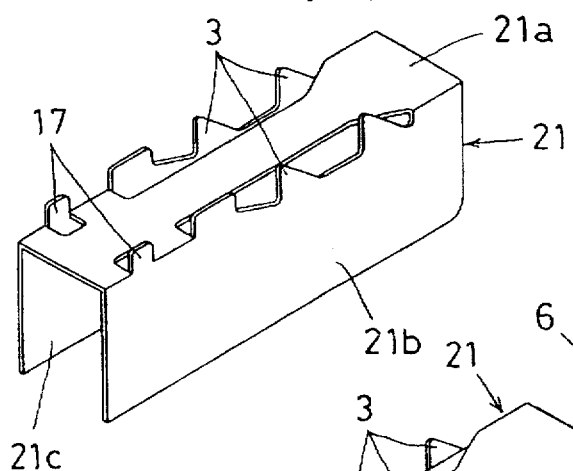
FIG. 23(a)
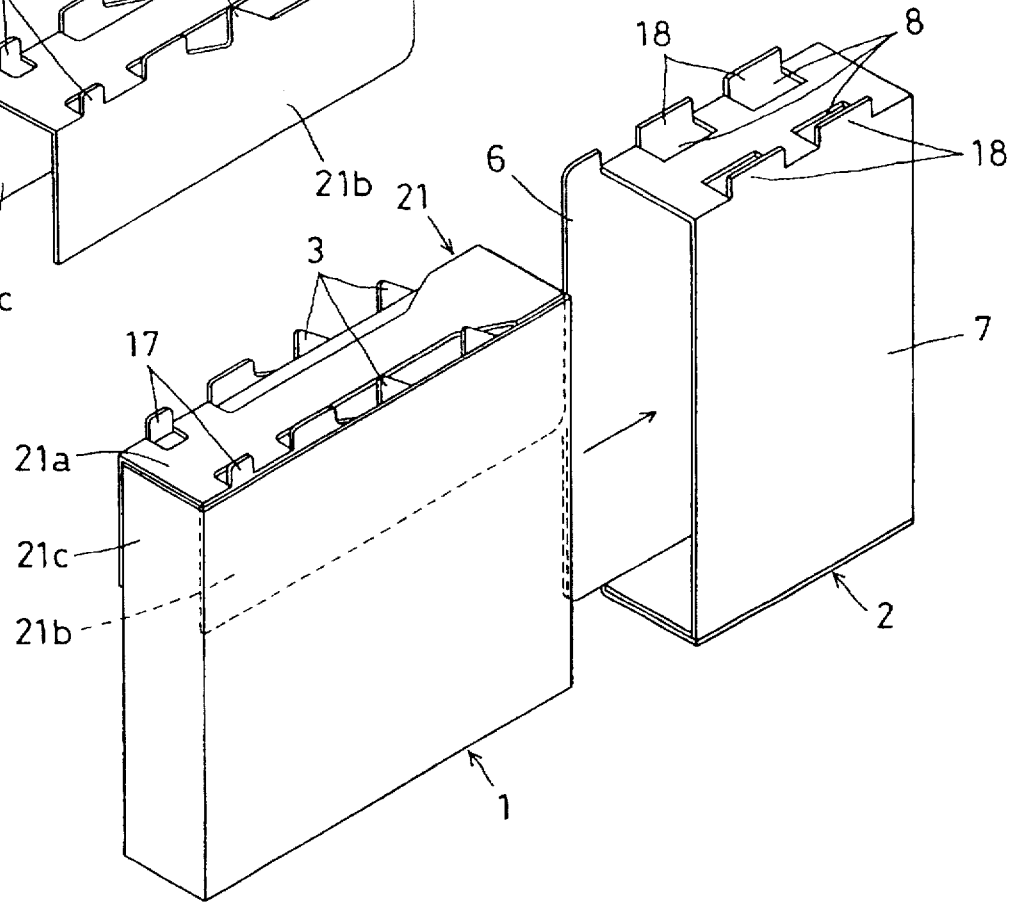
FIG. 23(b)
FIG. 24
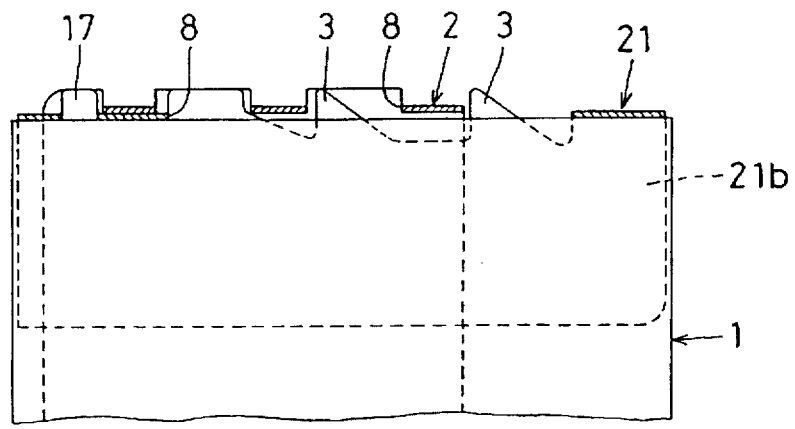

COMMODITY ANTITHEFT IMPLEMENT

BACKGROUND OF THE INVENTION

1. Field of the Invention

The present invention relates to a commodity antitheft implement for preventing a commodity stored in a case from being taken out of the case and individually stolen from rental shops of video cassettes, compact discs and the like, shops having a variety of commodities, and so forth.

2. Description of the Prior Art

In rental shops for video cassettes, compact discs and the like, each commodity is displayed as stored in a case on which its title and so forth are shown.

In such rental shops, the displayed commodities are possibly stolen. Therefore, lately, many shops adopt an antitheft system that is effected by attaching a sensing material such as a magnetic tape to each case, and when a person brings a commodity to the counter pretending to rent it but tries to carry away the commodity including the case without going through the regular rental procedure, the antitheft sensor operates at the exit.

However, despite the provision of such an antitheft system, there are still misdirected persons, who have an eye on the fact that no sensing material such as the magnetic tape is attached to the commodity itself stored in the case, who then takes the commodity out of the case and makes off with it in a pocket or the like.

If a long time or much labor is required for taking the commodity out of the case, even such a misdirected person will give up taking the commodity out of the case, according to the mentality of the misdirected person, because there is a great probability that the person will be noticed by a clerk.

OBJECTS OF THE INVENTION

Accordingly, it is an object of the present invention to provide a commodity antitheft implement which requires a long time or much labor for opening a case in order to prevent a commodity stored in the case from being stolen.

A further object of the present invention is to provide a commodity antitheft implement capable of confirming without hindrance the title and the like shown on the case with the commodity put in the case.

Another object of the present invention is to provide a commodity antitheft implement capable of being opened without hindrance when renting the commodity and assuring repetitive use thereof.

The above and other objects of the present invention will be understood more in detail from the following description with reference to the accompanying drawings showing illustrative examples.

BRIEF DESCRIPTION OF THE DRAWINGS

FIG. 23(a) is a perspective view of a slide preventing member according to an eighth embodiment;

FIG. 23(b) is a disassembled perspective view showing how the slide preventing member and a blocking member are mounted to a case; and FIG. 24 is a longitudinal sectional view of a state in which the slide preventing member and the blocking member are mounted to the case.

DETAILED DESCRIPTION OF THE PREFERRED EMBODIMENTS

A commodity antitheft implement according to a first embodiment as shown in FIGS. 1 through 5 has a construction in which a case 1 is enclosed by a blocking member 2 which prevents the case 1 from being opened as slidably fitted onto the case 1. It is provided with a locking pawl 3 which is caught by the blocking member 2 and is able to be thrust inwardly of the blocking member 2, thereby allowing the blocking member 2 to be mounted to the case 1 while being unable to slide in the sliding direction.

Figure 1:
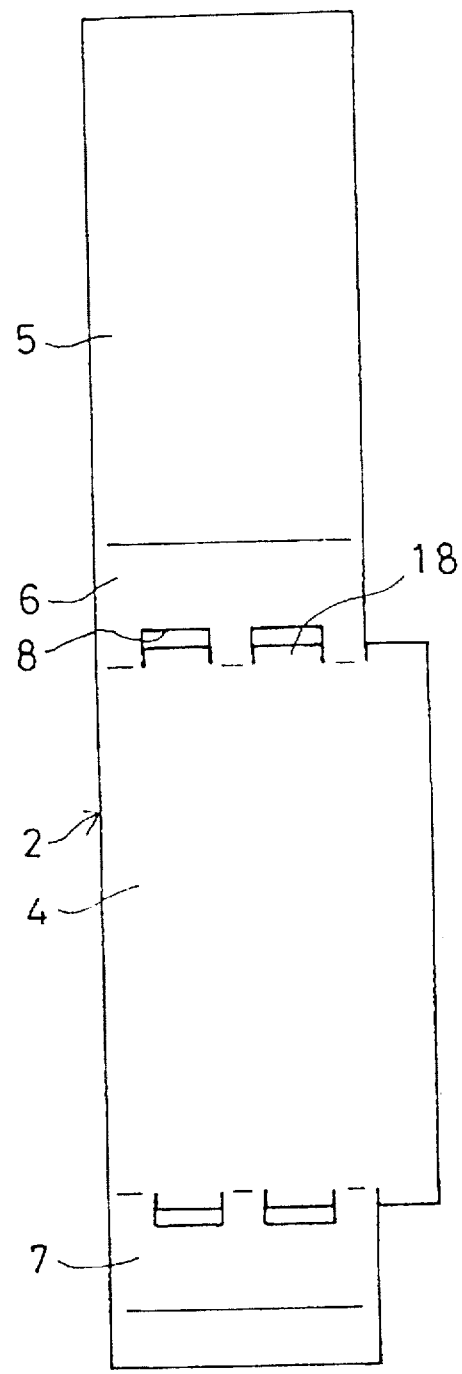
FIG. 1 is a perspective view of a blocking member of a commodity antitheft implement according to a first embodiment of the present invention.

The blocking member 2 constituting the commodity antitheft implement of the first embodiment is, as shown in an expanded plan view of FIG. 1, formed into a sectionally rectangular flat pipe shape by an upper wall 4, a lower wall 5, and side or end walls 6 and 7, and is opened at both its ends. A plurality of through holes 8 are formed at regular intervals at upper edges of both the end walls 6 and 7. The blocking member 2 is fitted onto the case 1 so that both the side walls 6 and 7 are superposed on both end walls 9 and 10 of the case 1, the end walls being able to be opened and closed. The lower wall 5 and a side wall 7 are connected with each other via an overlap width.

Figure 2:
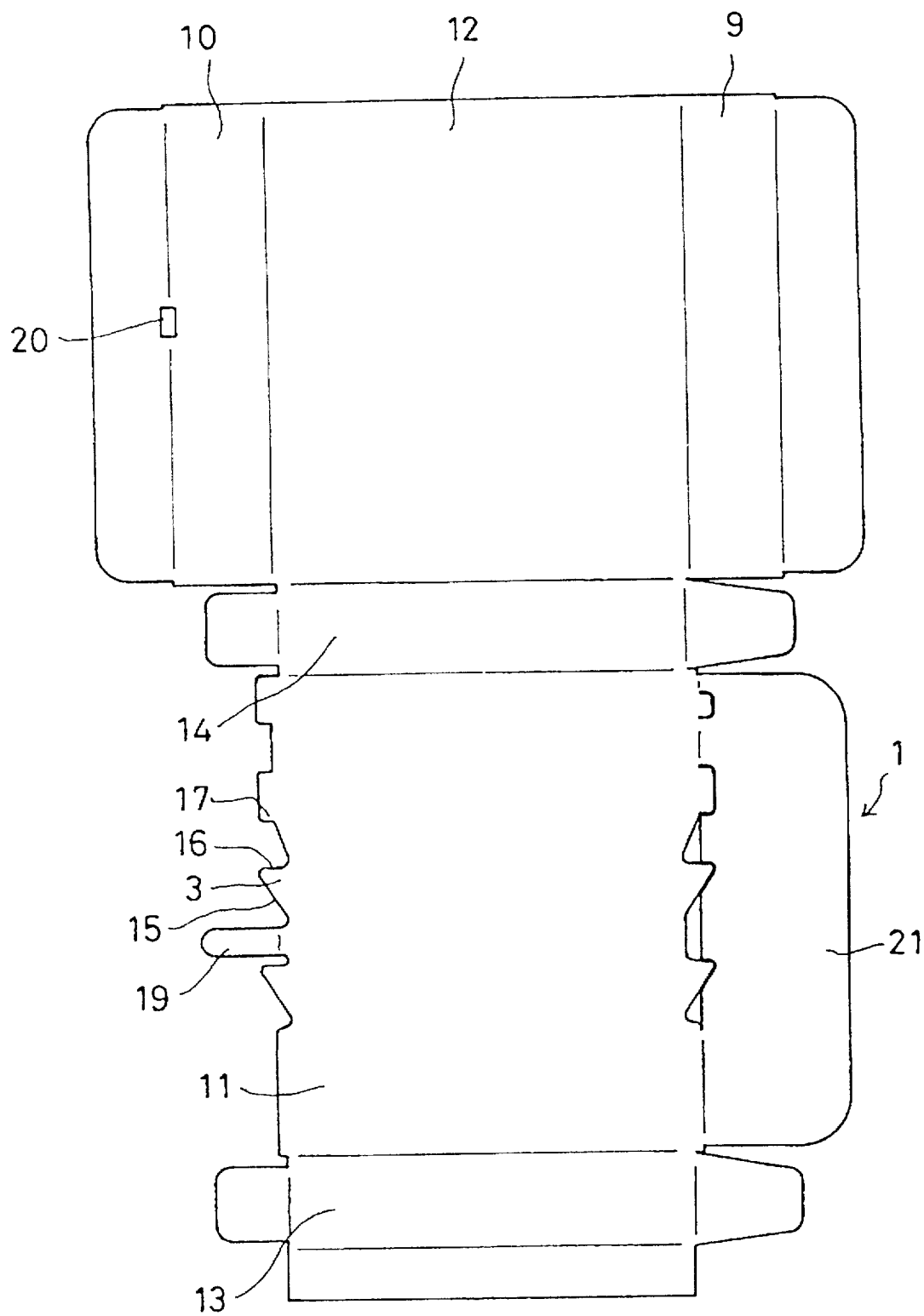
FIG. 2 is an expanded plan view of a case of the first embodiment.
Figure 3:
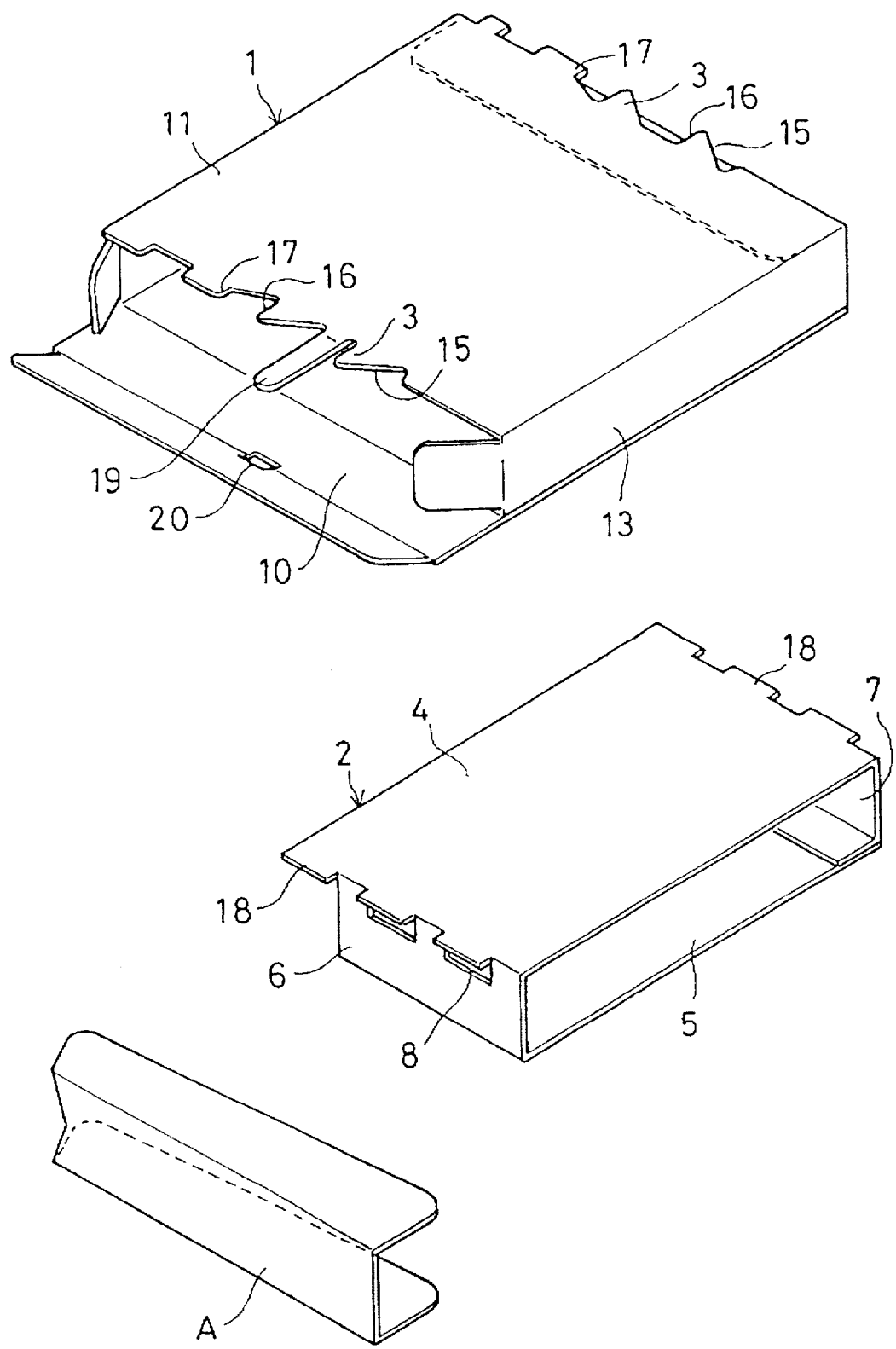
FIG. 3 is a perspective view of the case, the blocking member disassembled and an unlocking member.

On the other hand, the case 1 is constructed as shown in FIG. 2, where both the end walls 9 and 10 are provided while being able to be opened and closed at both ends of its barrel portion, having a sectionally rectangular pipe shape constituted by an upper wall 11, a lower wall 12 and side walls 13 and 14. At both edges of the upper wall 11, there are provided a plurality of locking pawls 3 which are to be caught in the through holes 8 of the blocking member 2 from the inside and protrude outwardly at their tip ends in correspondence with the through holes 8 of the blocking member 2.

It is to be noted that a reference numeral 19 denotes an engagement tab to be engaged with an engagement hole 20 provided at the end wall 10, while a reference numeral 21 denotes a fold flap to be folded inwardly on an internal surface of the upper wall 11.

The locking pawls 3 are formed so that they can be thrust inwardly of the blocking member 2. As a means for enabling the locking pawls 3 to be thrust inwardly of the blocking member 2, there can be adopted a method of forming the case 1 with an elastic material, a method of forming a U-shaped slit on the inner side of each locking pawl 3 of the upper wall 11 of the case 1, thereby allowing each locking pawl 3 to easily bend inward, or a method of forming a plurality of parallel bending lines or an elongated hole in a center portion of the upper wall 11 in the lengthwise direction of the case 1, thereby allowing the upper wall 11 itself to bend when the locking pawls 3 are inserted.

One of both side edges of each locking pawl 3 to be caught in each through hole 8 of the blocking member 2 is formed into an inclined edge 15 so that the blocking member 2 can be slid onto the case 1 in one direction, while the other side edge is formed into a perpendicular edge 16 so as to prevent the blocking member 2 from sliding in the opposite direction. Further, at both side edges of the upper wall 11 of the case 1 is formed a stopper 17 which stops the slide of the blocking member 2, arranged adjacent to the locking pawl 3 located at the end position in the sliding direction of the blocking member 2.

The through holes 8 and the locking pawls 3 may be formed on only one side of the blocking member 2 and the case 1.

Furthermore, it is preferable to form the blocking member 2 with a transparent synthetic resin material so that a title and the like on the case 1 can be seen with the blocking member 2 mounted on the case 1.

When using the blocking member 2 of the first embodiment, the blocking member 2 is mounted onto the case 1 in a manner as follows.

Figure 4:
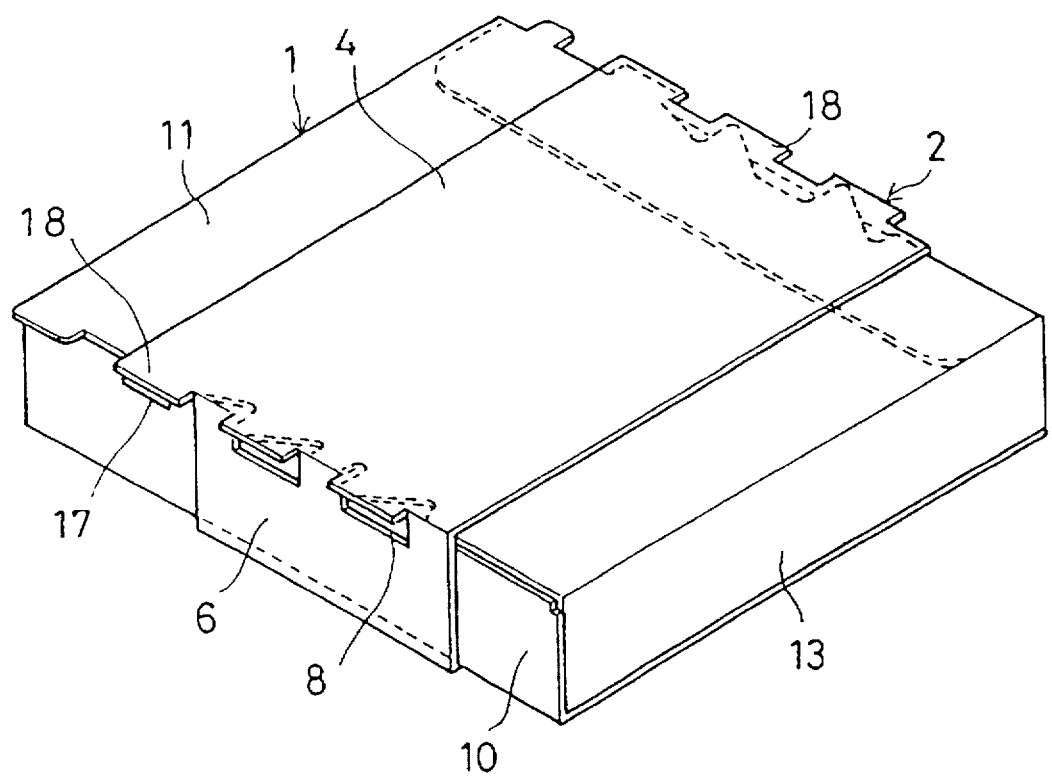
FIG. 4 is a perspective view of a state in which the blocking member is mounted to the case.

When sliding the blocking member 2 on the case 1 until the end portion of the blocking member 2 abuts against the stopper 17 of the case 1, the locking pawls 3 of the case 1 are caught in the through holes 8 of the blocking member 2 in a manner as shown in FIG. 4, where the blocking member 2 does not slide in either direction.

Therefore, when taking the commodity out of the case 1, it is required to firstly thrust the locking pawls 3 of the case 1 inwardly of the blocking member 2 and then slide the blocking member 2. Thus the blocking member 2 cannot be easily removed.

Furthermore, according to the first embodiment, at both side edges of the upper wall 4 of the blocking member 2, there are formed thrust preventing flaps 18 which protrude outwardly over the locking pawls 3 in a state in which the blocking member 2 is mounted on the case 1 with the locking pawls 3 of the case 1 caught in the through holes 8 of the blocking member 2.

When the thrust preventing flaps 18 are formed, if it is tried to thrust the locking pawls 3 inward by pushing them against a table or the like with the locking pawls 3 of the case 1 caught in the through holes 8 of the blocking member 2, the thrust preventing flaps 18 stretch against the table or the like to prevent the locking pawls 3 from being thrust inwardly of the blocking member 2, thereby assuring a further improved antitheft effect.

Figure 5A:
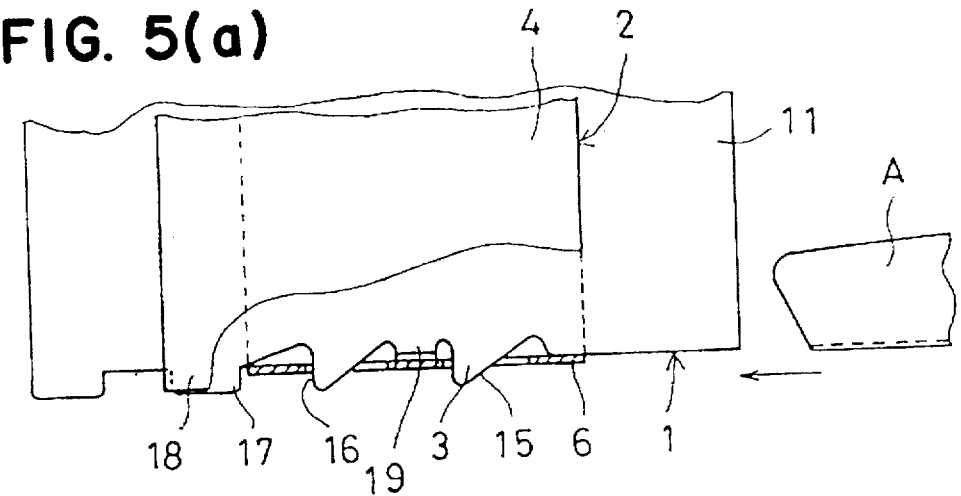
FIGS. 5(a), (b) and (c) are explanatory views of a procedure for pulling out the blocking member by means of the unlocking member.
Figure 5B:
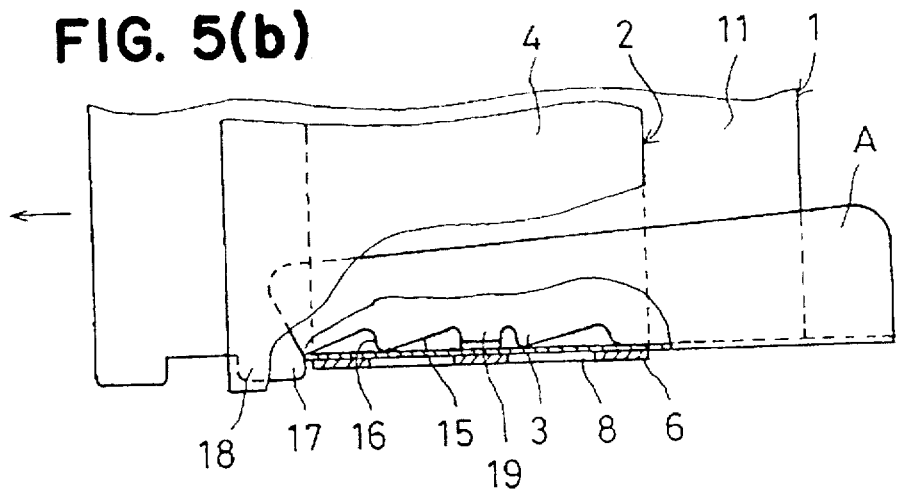
Figure 5C:
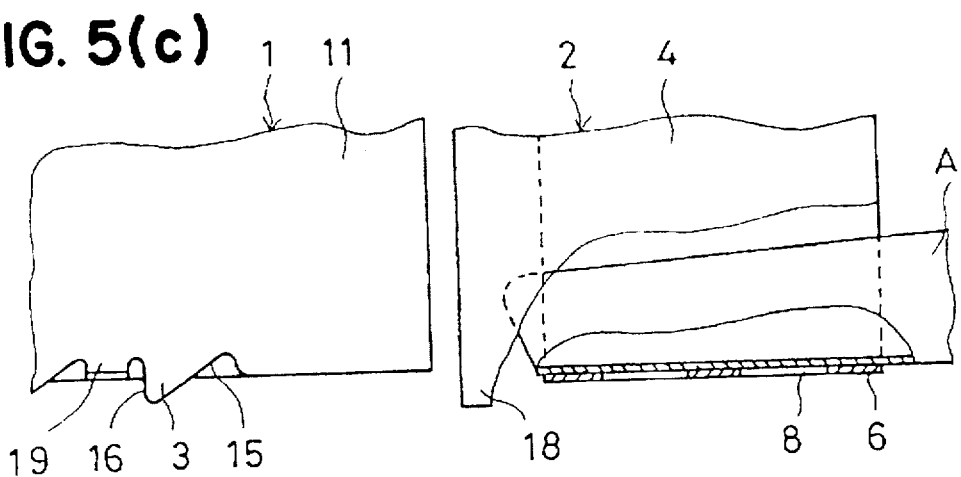
Figure 6:
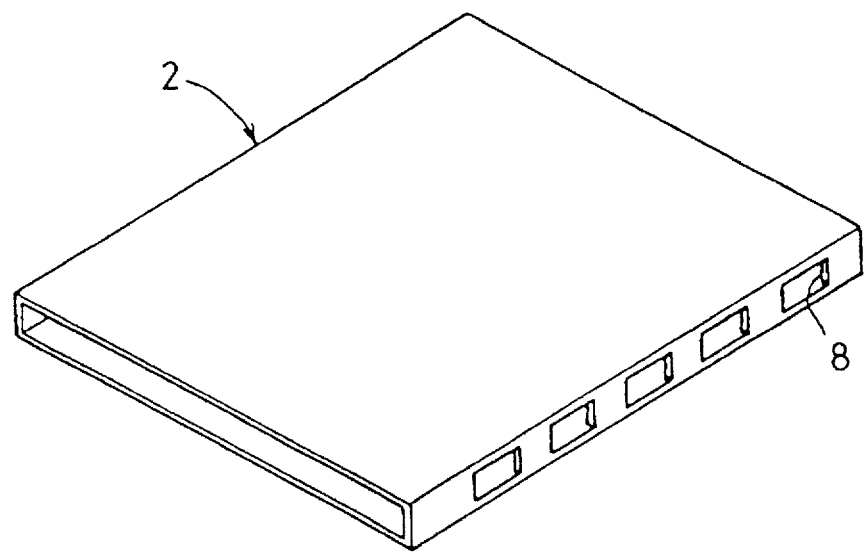
FIG. 6 is a perspective view of a blocking member of a commodity antitheft implement according to a second embodiment.

When removing the blocking member 2 from the case 1, as shown in the order of FIGS. 5(a), (b) and (c), it is proper to insert an unlocking tool A having a bracket-like sectional shape between the case 1 and the blocking member 2 to thrust the locking pawl 3 of the case 1 inwardly of the blocking member 2, and pull out the blocking member 2 together with the unlocking tool A.

Next, a commodity antitheft implement according to a second embodiment is shown in FIGS. 6 through 13. A blocking member 2 encloses a case 1 for storing a commodity so as to prevent the case 1 from being opened as slidably fitted on the case 1. A slide preventing member 21 has a locking pawl 3 to be caught by the blocking member 2 and is mounted to the case 1 while being unable to slide in the sliding direction of the blocking member 2 with respect to the case 1.

The blocking member 2 of the second embodiment is formed into a sectionally rectangular pipe shape whose both ends are opened, while a plurality of through holes 8 are formed at one side surface.

On the other hand, the slide preventing member 21 is constituted by a plate-shaped body to be inserted into the sectionally rectangular flat pipe-shaped blocking member 2. Its one side is formed with a plurality of locking pawls 3 which are to be caught in the through holes 8 of the blocking member 2 from the inside and protrude outwardly at their tip ends in correspondence with the through holes 8 of the blocking member 2.

Figure 7:
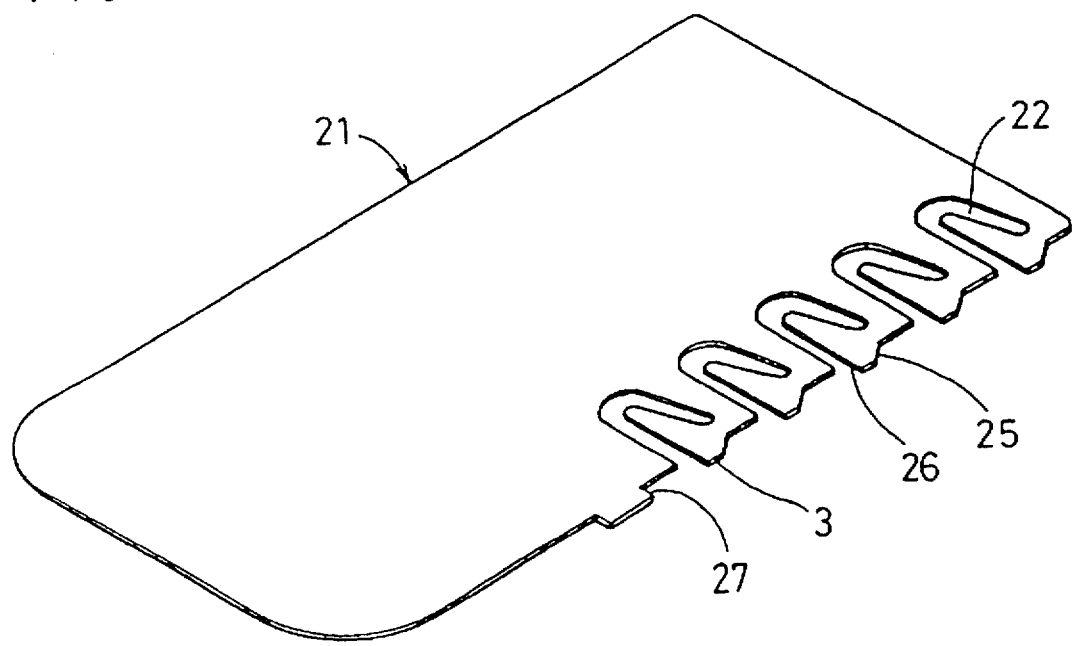
FIG. 7 is a perspective view of a slide preventing member of the above embodiment.
Figure 8:
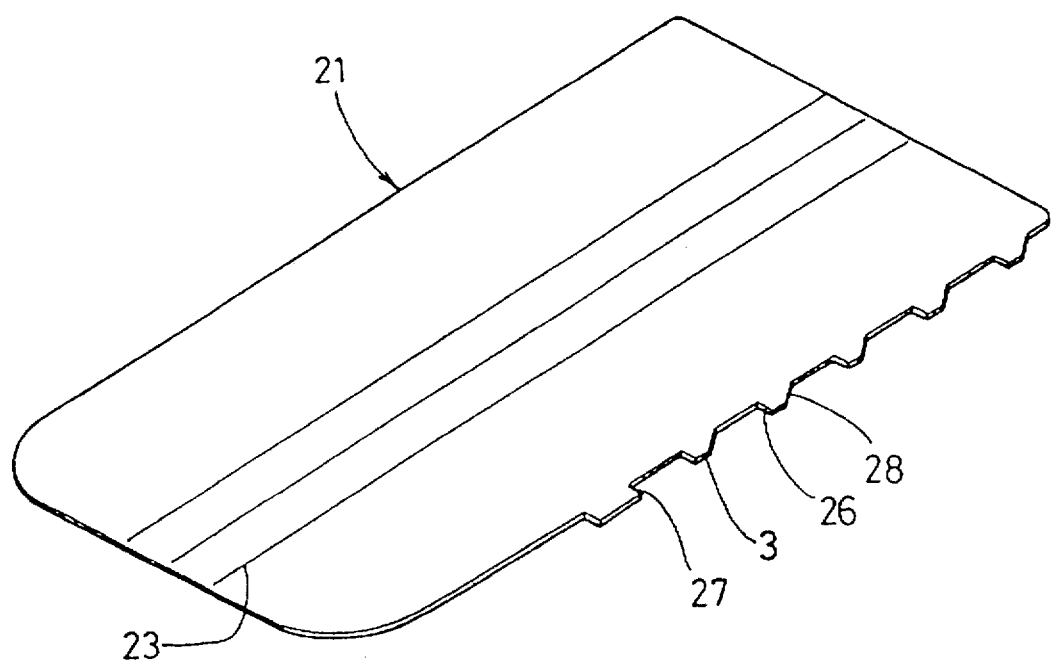
FIG. 8 is a perspective view of a slide preventing member of another example.
Figure 9:
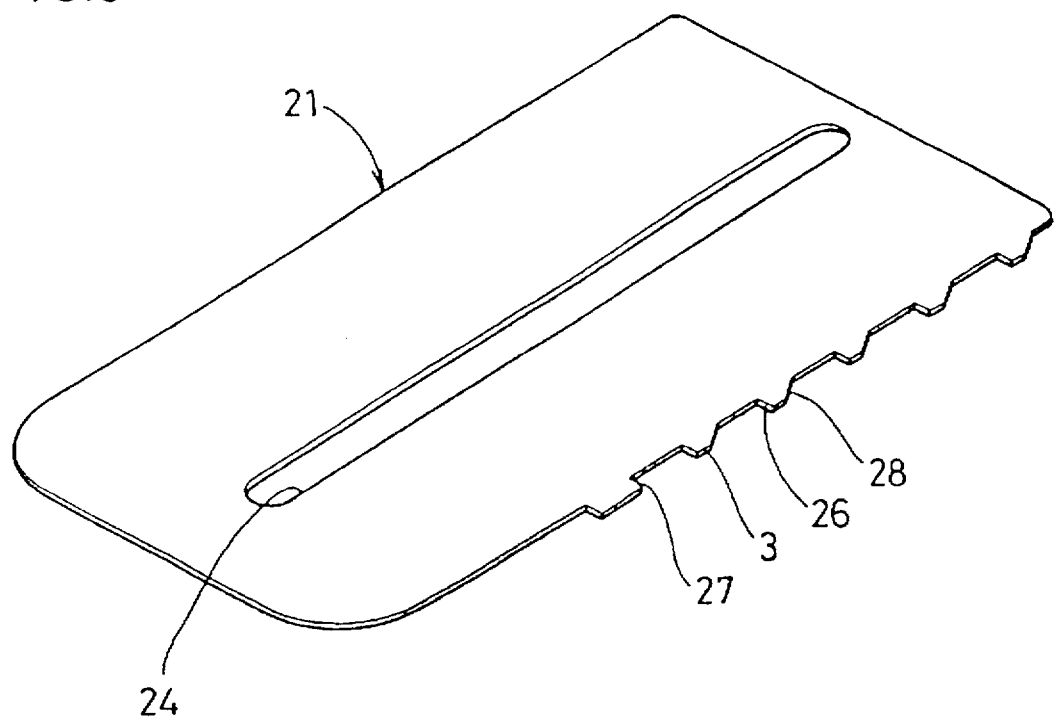
FIG. 9 is a perspective view of a slide preventing member of yet another example.

The locking pawls 3 are formed so that they can be thrust into the blocking member 2. As means for enabling the locking pawls 3 to enter into the blocking member 2, there is a method of forming a U-shaped slit 22 on the inner side of each locking pawl 3 in the plate body that constitutes the slide preventing member 21, thereby allowing each locking pawl 3 to easily bend inward as shown in FIG. 7, a method of forming a plurality of parallel bending lines 23 (FIG. 8), an elongated hole 24 in a center portion of the plate body in its lengthwise direction thereby allowing the plate body itself to bend when the locking pawls 3 are inserted (FIG.9), and a method of forming the plate body constituting the locking pawl 3 with a material which has an elasticity and is able to be thrust inward.

One of both side edges of each locking pawl 3 to be caught in each through hole 8 of the blocking member 2 is formed into an inclined edge 25 so that the blocking member 2 can be slid onto the slide preventing member 21 in one direction. The other side edge is formed into a perpendicular edge 26 so as to prevent the blocking member 2 from sliding in the opposite direction. Further, the slide preventing member 21 is formed with a stopper 27 which stops the slide of the blocking member 2 as arranged adjacent to the locking pawl 3 located at the end position in the sliding direction of the blocking member 2.

The through holes 8 and the locking pawls 3 may be formed on both sides of the blocking member 2 and the slide preventing member 21.

Furthermore, it is preferable to form the blocking member 2 and the slide preventing member 21 with a transparent synthetic resin material so that a title and the like on the case 1 can be seen with the members mounted on the case 1.

When using the blocking member 2 and the slide preventing member 21 of the second embodiment, the slide preventing member 21 is mounted onto the case 1 in a manner as follows.

Figure 10:
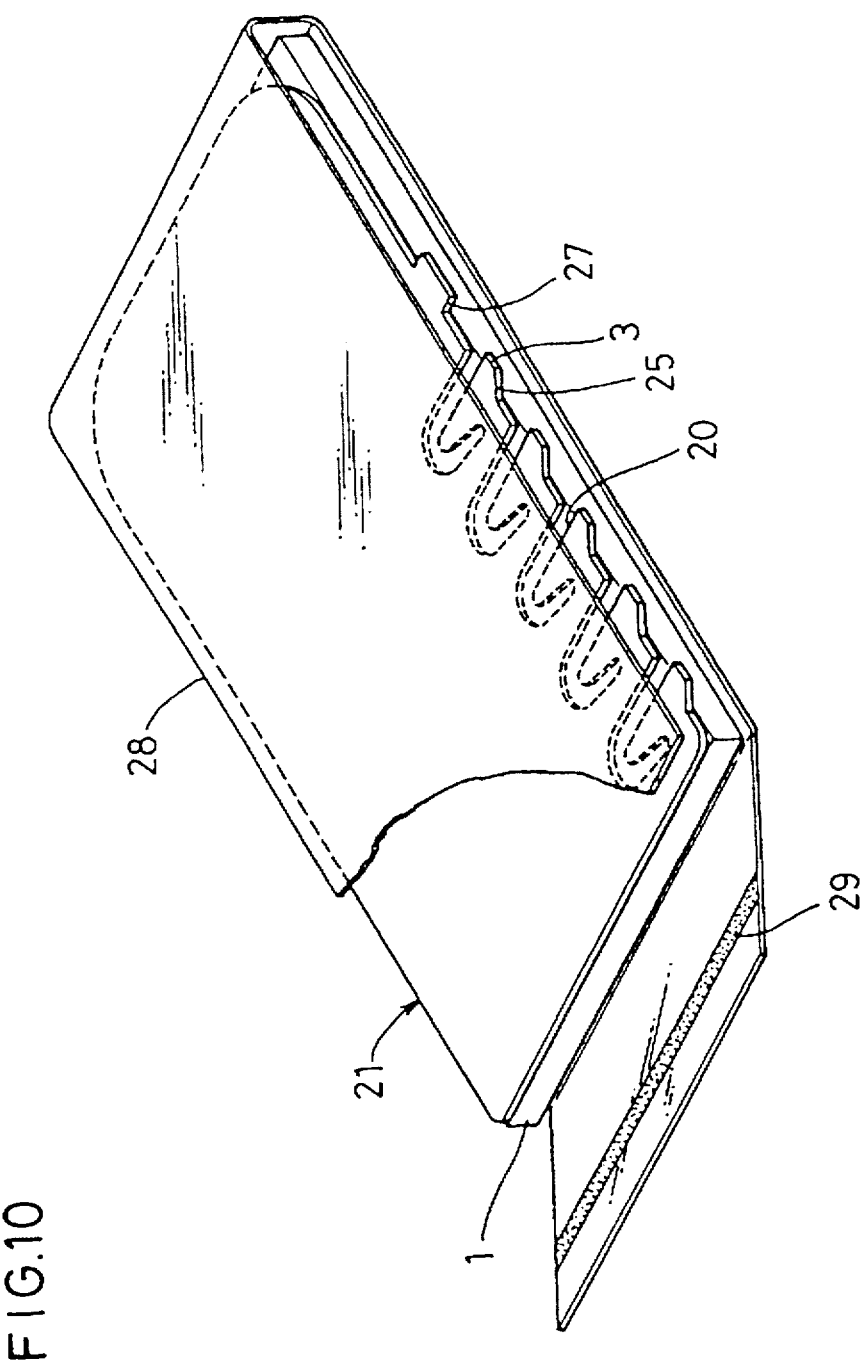
FIG. 10 is a perspective view of a state in which the slide preventing member is mounted to a case.

In an example as shown in FIG. 10, the slide preventing member 21 is superposed on the outer surface of the case 1, and a sheet 28 is mounted onto the case 1, wrapped around the case 1 in a state in which the locking pawls 3 of the slide preventing member 21 protrude sideward. Overlapped portions of the sheet 28 are connected with each other by an adhesive 29 coated on a rear surface of its end portion. Further, the overlapped portions of the sheet 28 are located inside the blocking member 2 when the blocking member 2 is fit thereon.

Figure 11:
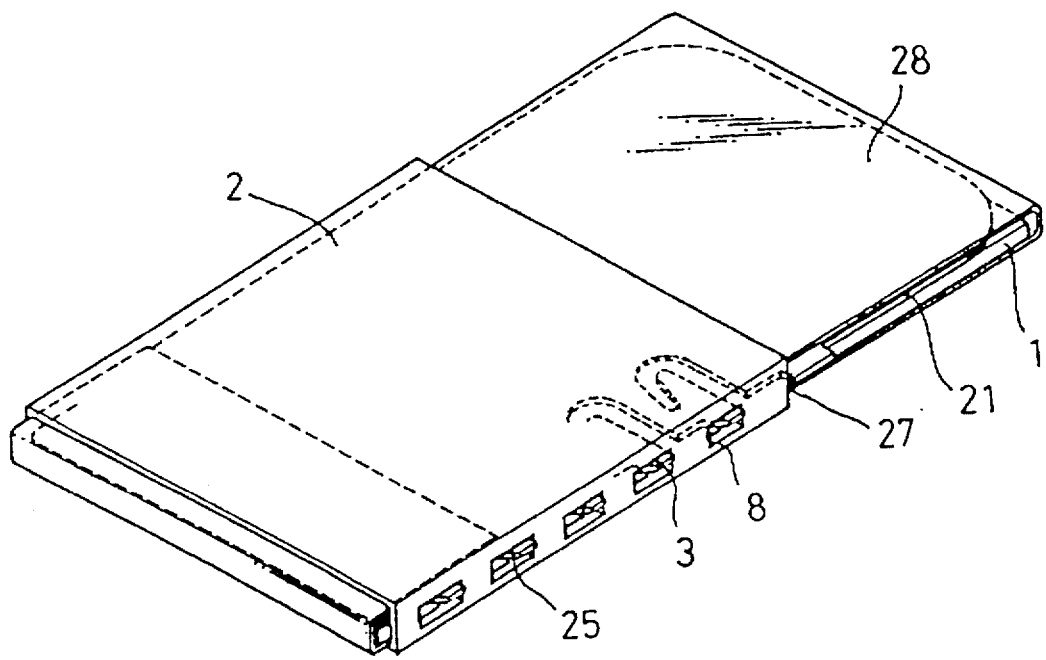
FIG. 11 is a perspective view of a state in which the slide preventing member and the blocking member are mounted to the case.
Figure 12:
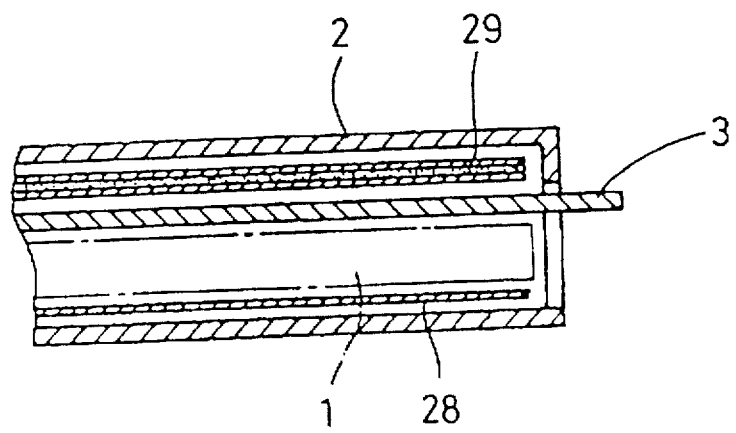
FIG. 12 is a longitudinal sectional view of a part of FIG. 11.

After the slide preventing member 21 is thus mounted to the case 1, by fitting the blocking member 2 onto the case 1 in a sliding manner until the end portion of the blocking member 2 abuts against the stopper 27 of the slide preventing member 21, the locking pawls 3 of the slide preventing member 21 are caught in the through holes 8 of the blocking member 2. Thus the blocking member 2 does not slide in either direction, as shown in FIGS. 11 and 12.

Therefore, when taking out the commodity inside the case 1, it is required to thrust the locking pawls 3 of the slide preventing member 21 inwardly of the blocking member 2 and then slide the blocking member 2. Thus the blocking member 2 cannot be easily removed.

Figure 13:
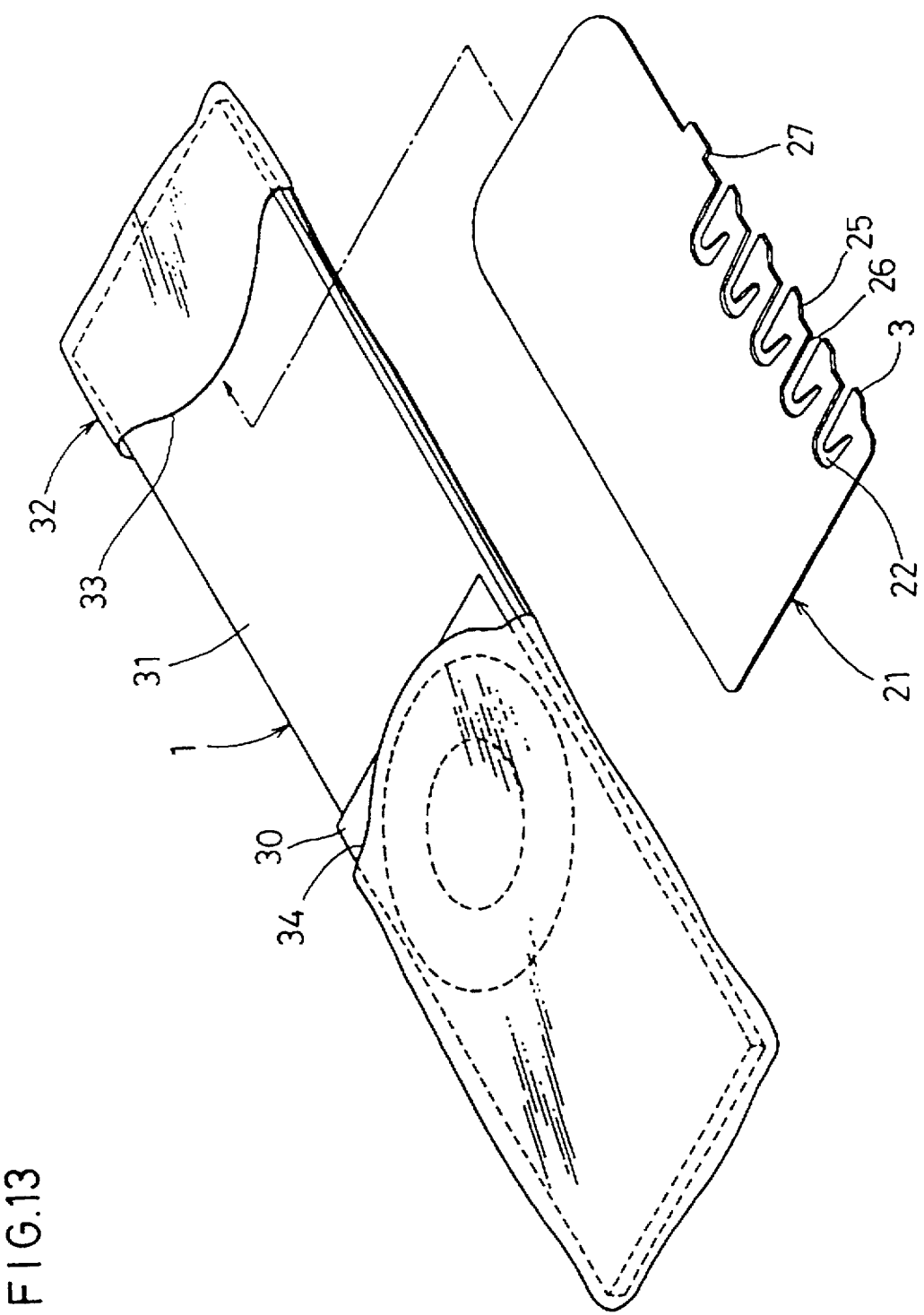
FIG. 13 is a perspective view of a state of another example in which the slide preventing member is mounted to the case.

FIG. 13 shows another example of mounting the slide preventing member 21 of the second embodiment to the case 1. In this example, the case 1 is comprised of a case body 30 having a commodity storing section on its upper surface and a paper cover 31 for covering the case body 30. The paper cover 31 is formed of a front paper cover and a rear paper cover. The case body 30 is bonded to an inner surface of one rear paper cover constituting the cover 31. Then, the case 1 is covered with a cover 32 that is formed with pocket portions 33 and 34 provided on both sides. The slide preventing member 21 has its one end portion inserted into the pocket portion 33 of the cover 32 into which the front paper cover is inserted so that it is superposed on an inner surface of the other front paper cover of the paper cover 31.

Figure 14A:
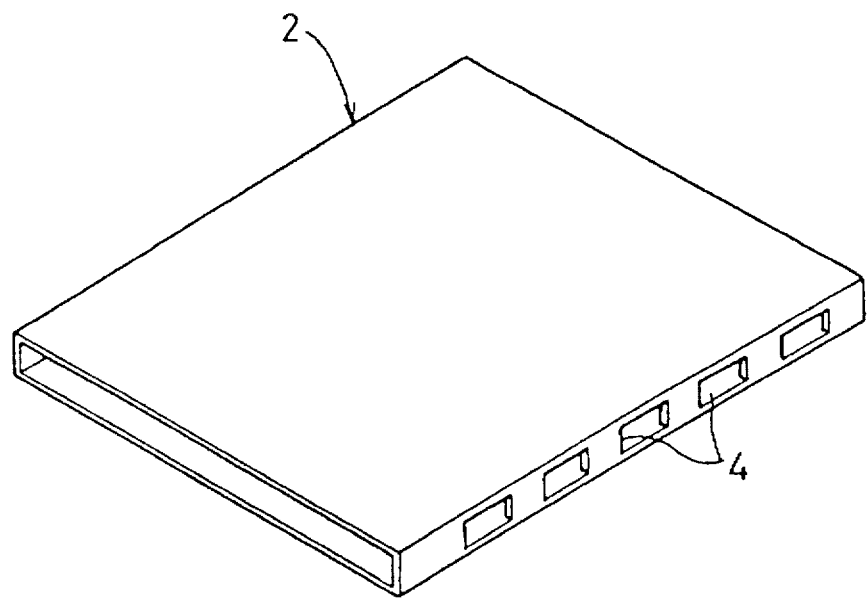
FIGS. 14(a) and (b) are perspective views of a blocking member and a slide preventing member according to a third embodiment.
Figure 14B:
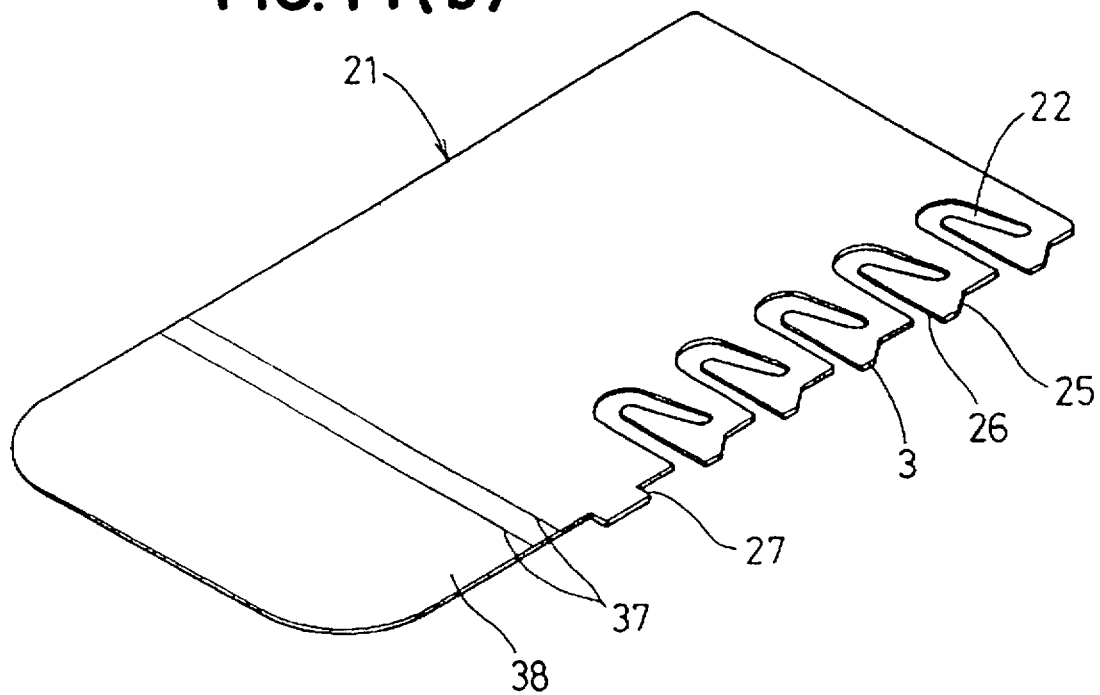
Figure 15:
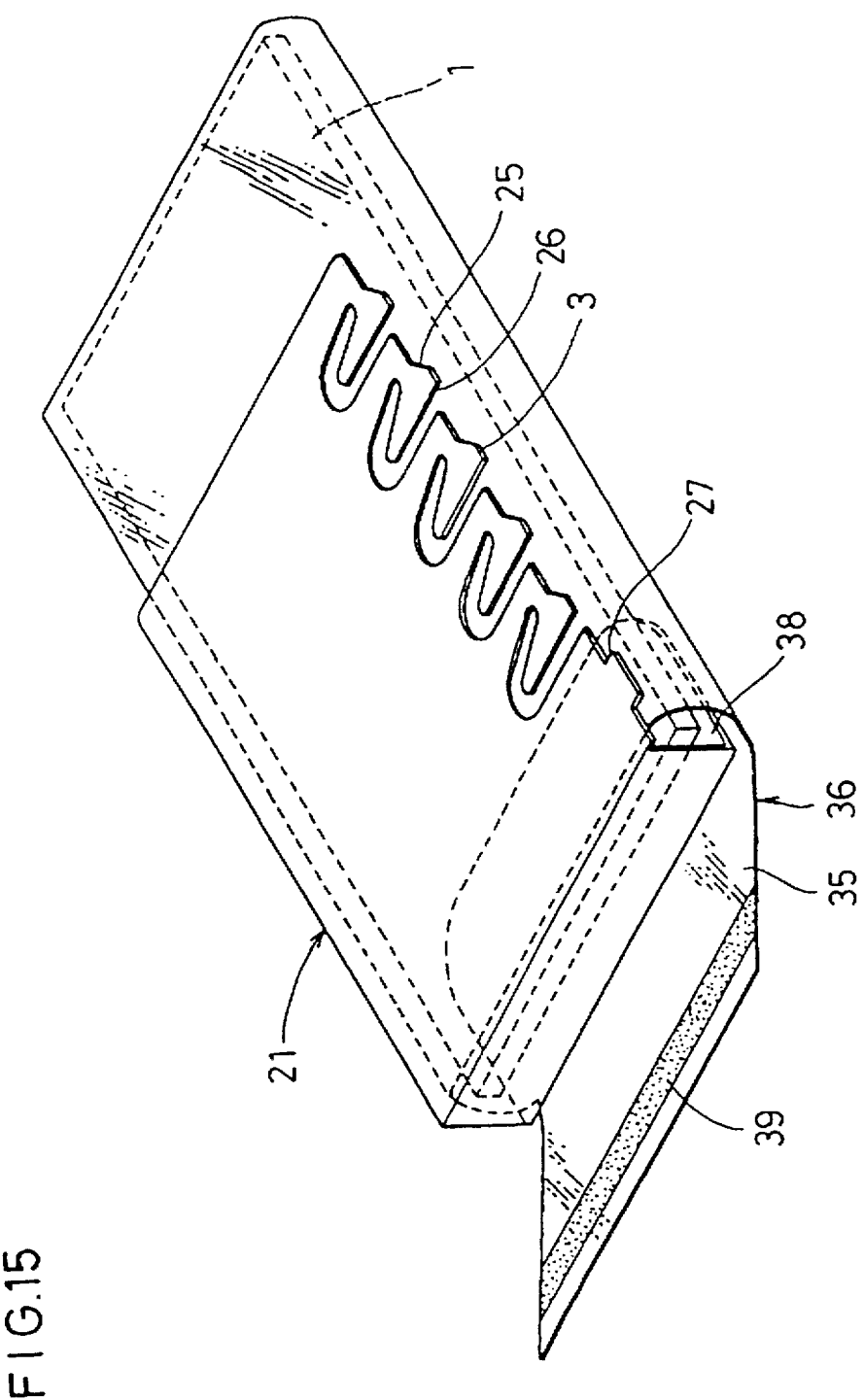
FIG. 15 is a perspective view of a state in which the slide preventing member is mounted to a case.

A third embodiment, as shown in FIGS. 14(a) and (b), is an example to be used when the case 1 is stored in a pocket cover 36 which has a closing flap 35 at its opening portion as shown in FIG. 15. The slide preventing member 21 of this example is provided continuously with an insert member 38 via two parallel bending lines 37 at its one end. The slide preventing member 21 is mounted to the case 1 in a manner as shown in FIG. 15 by opening the closing flap 35, inserting the insert member 38 between the pocket cover 36 and the case 1, superposing the slide preventing member 21 on the outer surface of the pocket cover 36, and then superposing the closing flap 35 of the pocket cover 36 on the outer surface of the slide preventing member 21. It is to be noted that an inner surface of the closing flap 35 is coated with an adhesive 39.

Figure 16:
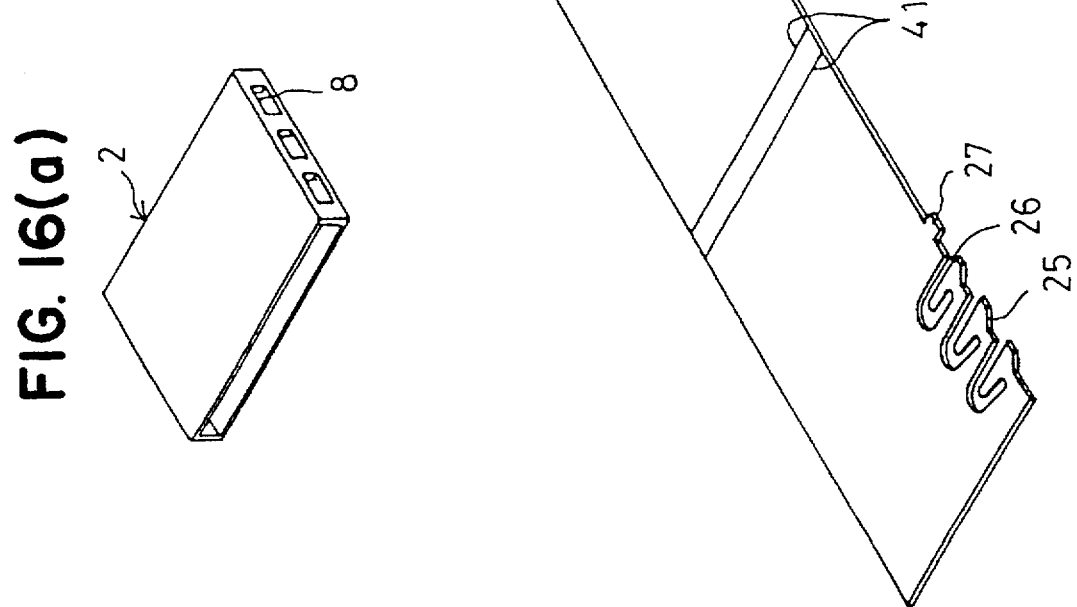
FIGS. 16(a) and (b) are perspective views of a blocking member and a slide preventing member according to a fourth embodiment.
Figure 17:
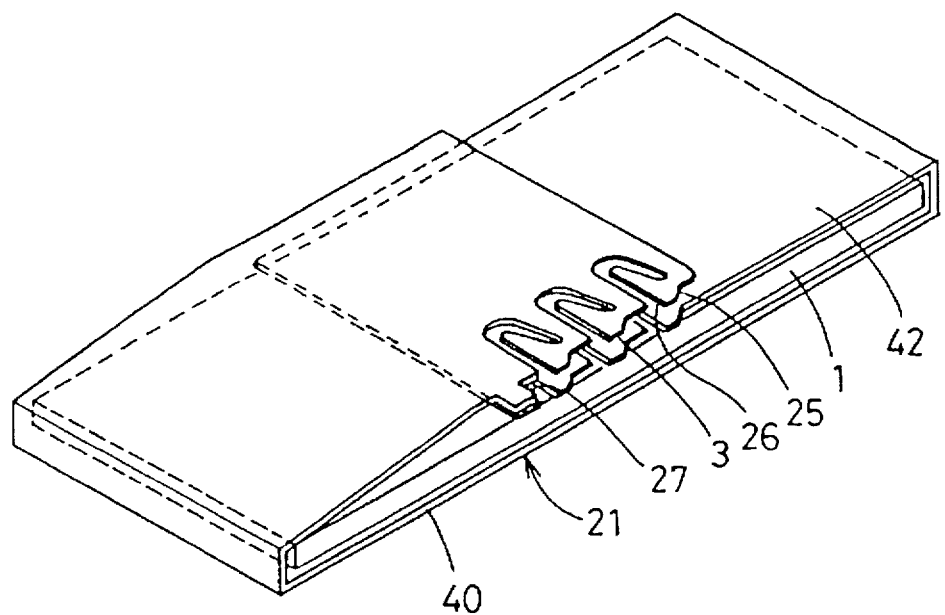
FIG. 17 is a perspective view of a state in which the slide preventing member is mounted to a case.

Next, FIGS. 16(a) and (b) show a fourth embodiment having a varied way of mounting the slide preventing member 21 to the case 1. According to the present embodiment, the slide preventing member 21 is comprised of a rear plate 40 to be superposed on the rear surface of the case 1, and a front plate 42 which is provided continuously therefrom at both ends of the rear plate each via respective two bending lines 41 and has an overlapped portion on the front side of the case 1, while locking pawls 3 are formed at one side edge of the front plate 42. The blocking member 2 is the same as that of the third embodiment, and it is fitted on an assembly formed by mounting the slide preventing member 21 to the case 1 as shown in FIG. 17.

Figure 19:
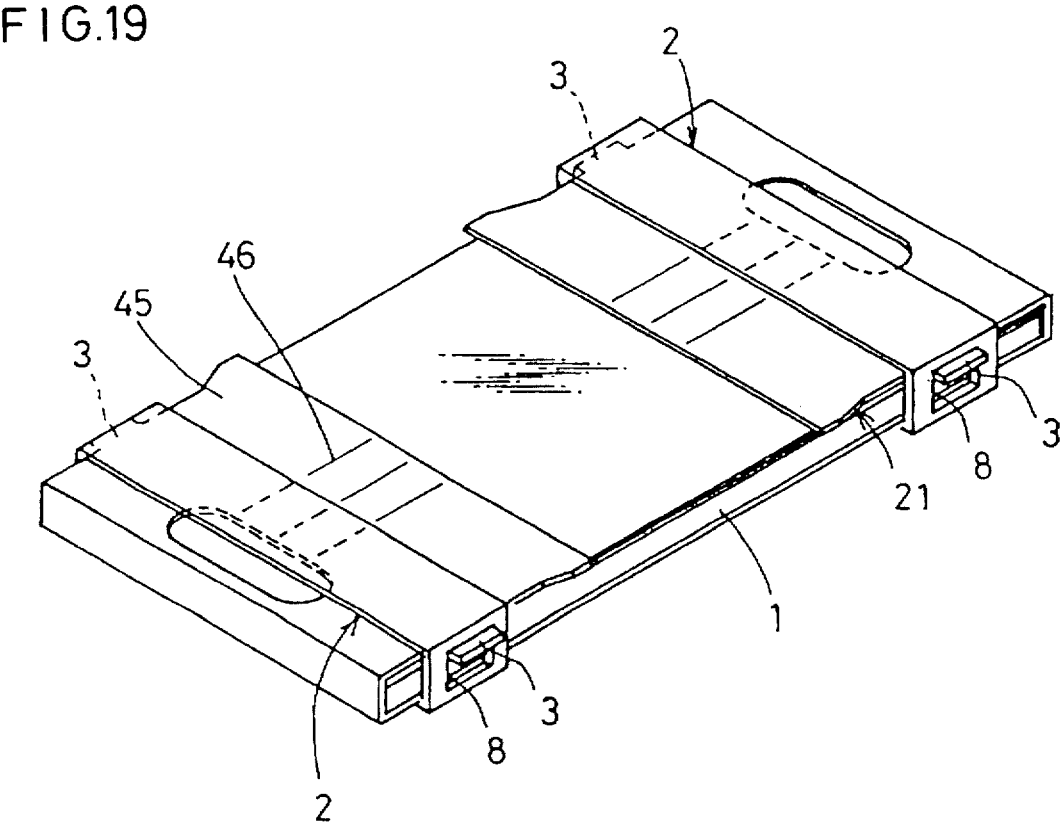
FIG. 19 is a perspective view of a state in which the slide preventing member and the blocking member are mounted to the case.
Figure 18:
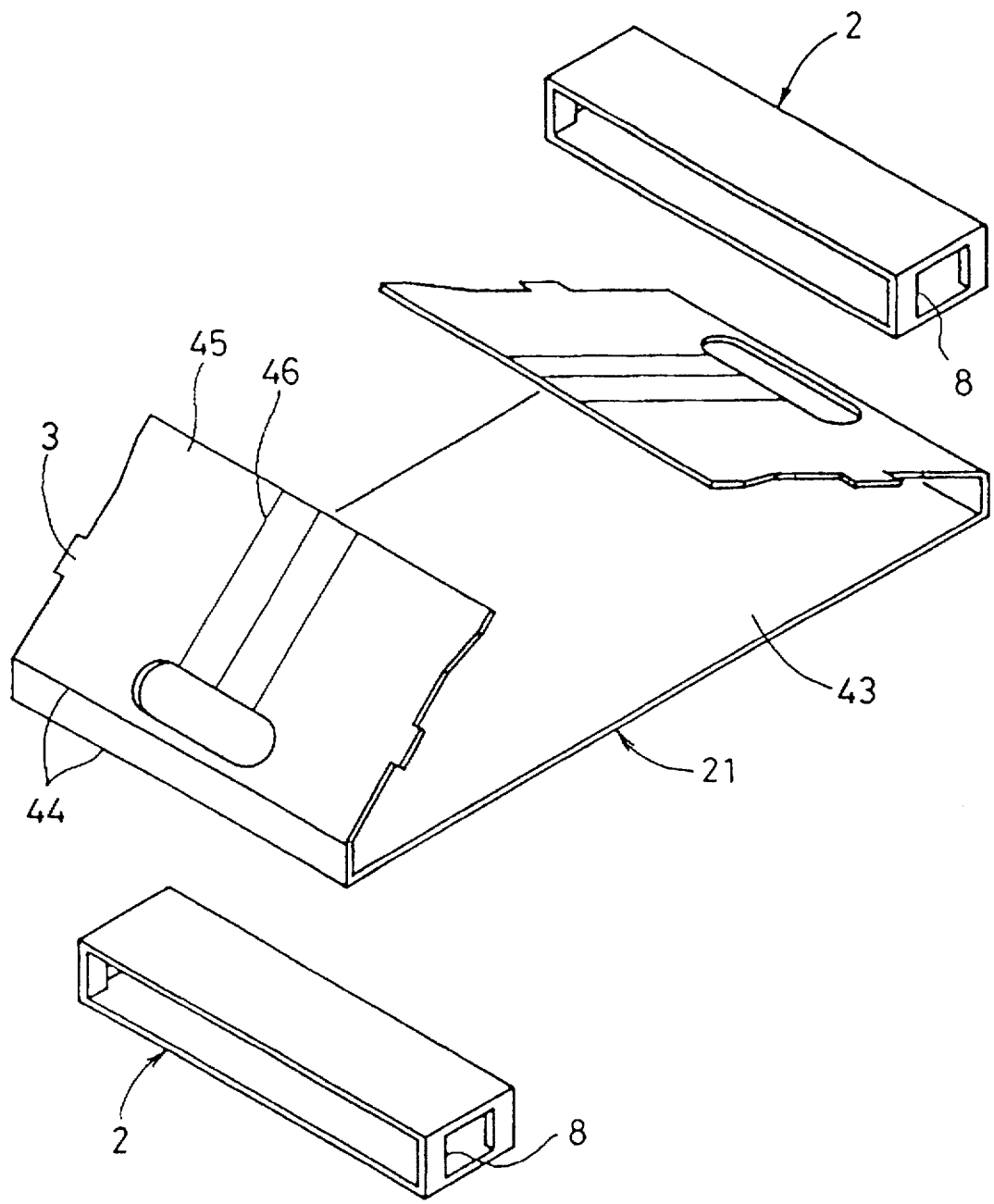
FIG. 18 is a perspective view of a disassembled commodity antitheft implement according to a fifth embodiment.

Next, FIGS. 18 and 19 show a fifth embodiment, which is similar to the fourth embodiment in terms of the way of mounting the slide preventing member 21 to the case 1.

The slide preventing member 21 of the present embodiment is comprised of a rear plate 43 to be superposed on the rear surface of the case 1 and a front plate 45 which is provided continuously therefrom at both ends of the rear plate via two respective bending lines 44 and superposed on the front surface of the case 1 similarly to the fourth embodiment. Both ends of the front plate 45 are formed so that they do not overlap each other, with no specified interval provided between them. Then, two belt-shaped blocking members 2 are used so that they wrap end portions of the front plate 45 at both the ends. It is to be noted that the locking pawls 3 can be thrust inward by virtue of three parallel bending lines 46 formed in a center portion of the front plate 45.

Figure 20:
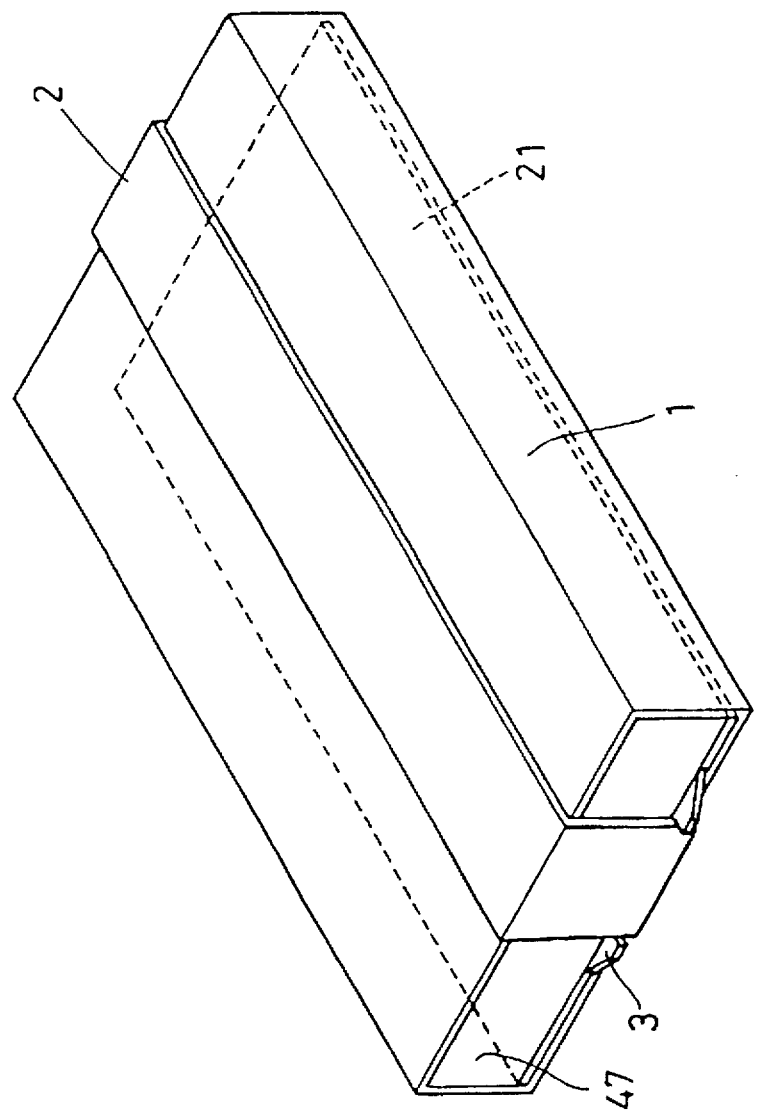
FIG. 20 is a perspective view of a state in which a slide preventing member and a blocking member according to a sixth embodiment are mounted to a case.

Next, FIG. 20 shows a sixth embodiment of the blocking member 2 and the slide preventing member 21 appropriate for use in a case 1 which can store therein a commodity such as a video cassette while allowing the commodity to be put in and out through an opening 47 formed at its one face plane.

According to the present example, a plate-shaped slide preventing member 21 is stored in the case 1 together with the commodity, and a pair of locking pawls 3 of the slide preventing member 21 are formed so that they are protruding from the opening 47, thereby allowing a blocking member 2 that is fitted in between the pair of protruding locking pawls 3 to be caught therein while traversing the opening 47.

Figure 21:
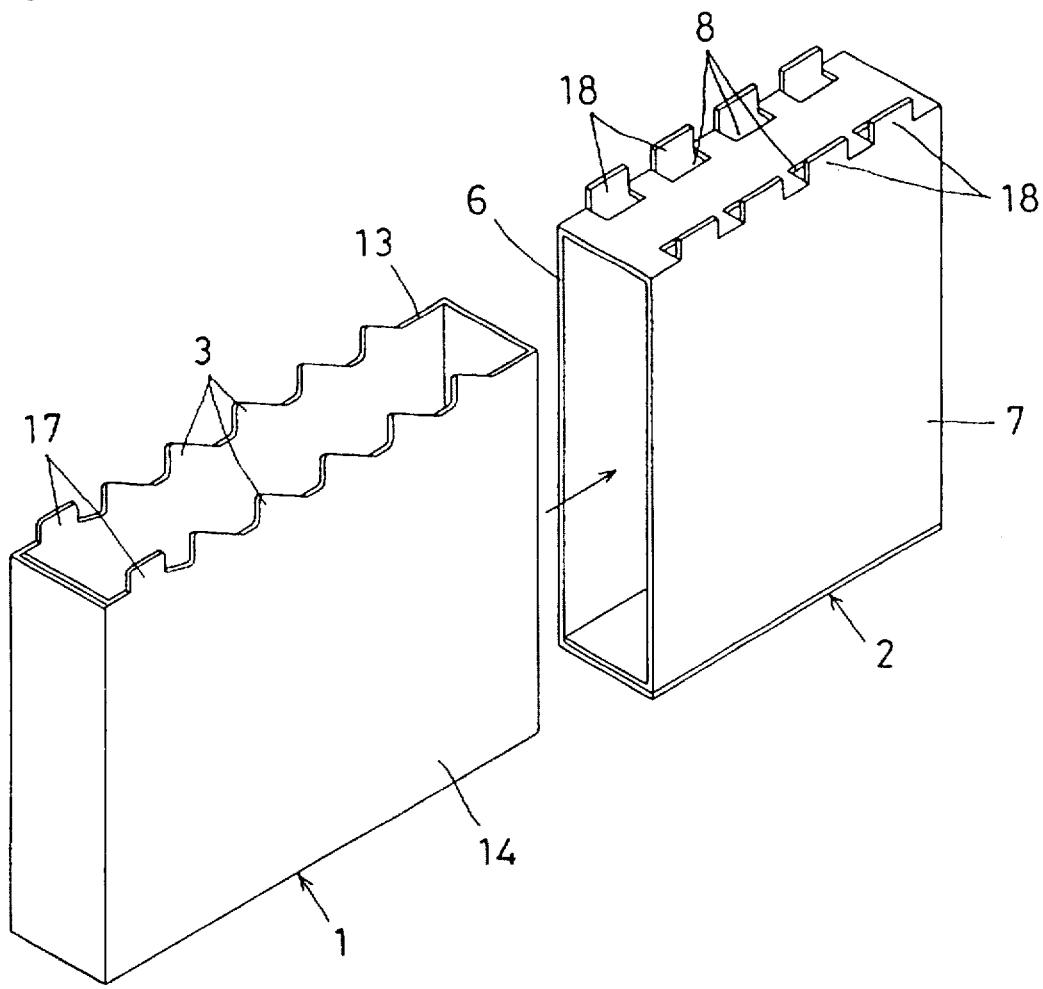
FIG. 21 is a perspective view of a disassembled slide preventing member and blocking member according to a seventh embodiment.
Figure 22:
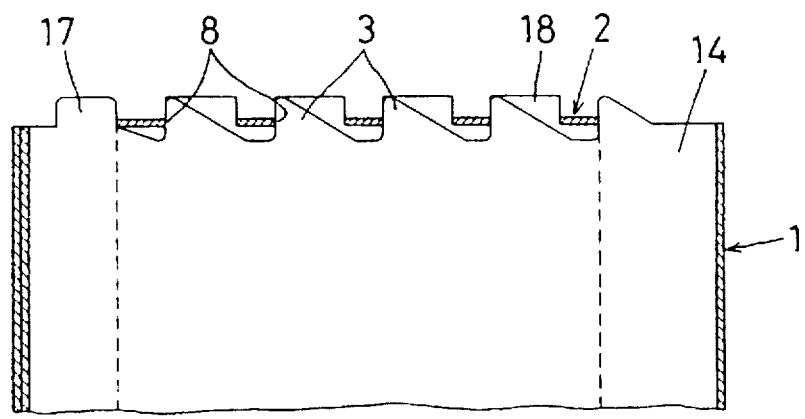
FIG. 22 is a perspective view of a state in which the slide preventing member and the blocking member of the above embodiment are mounted.

Next, a seventh embodiment as shown in FIGS. 21 and 22 is comprised of a blocking member 2 and a case 1 which concurrently serves as a slide preventing member 21. The blocking member 2 is formed into a sectionally rectangular pipe shape so that it is slidably fitted onto the case 1, where a plurality of through holes 8 are provided at an upper edge portion of both side walls 6 and 7, and protruding portions 18 are provided outside the through holes 8.

The case 1 is formed into a closed-end shape having its upper portion opened so as to allow a commodity to be stored inside. A plurality of locking pawls 3 which protrude above the upper ends of both side walls 13 and 14 are provided in correspondence with the through holes 8 of the blocking member 2, while stoppers 17 which stop the slide of the blocking member 2 as provided adjacent to the locking pawls 3 at the end positions in the sliding direction are provided.

According to the seventh embodiment, by inserting the case 1 which stores therein a commodity into the blocking member 2 until the stoppers 17 abut against the blocking member 2, the locking pawls 3 are caught in the through holes 8, and the blocking member 2 does not slide in either direction with the opening of the case 1 closed.

In this state, the blocking member 2 is provided with the protruding portions 18 formed in the direction in which the locking pawls 3 protrude. Therefore, if it is tried to thrust the locking pawls 3 against a flat surface such as a shelf, the protruding portions 18 abut against the surface, thereby preventing the locking pawls 3 from being thrust inwardly of the blocking member 2. With this arrangement, a special thrusting tool or the like to be abutted against the locking pawls 3 must be used in order to thrust the locking pawls 3, and this does not allow any person except for a clerk to easily remove the blocking member 2.

An eighth embodiment as shown in FIGS. 23 and 24 is a modified example of the aforementioned seventh embodiment, where the blocking member 2 has the same structure as that of the seventh embodiment, and the slide preventing member 21 is provided separately from the case 1. A side wall 21b to be inserted into the case 1 and a side wall 21c to be superposed on the outer surface of the case 1 are provided on both sides of an upper wall portion 21a. A plurality of locking pawls 3 and stoppers 17 are provided at upper end portions of both the side walls 21b and 21c.

According to the eighth embodiment, by mounting the slide preventing member 21 to an upper portion of the case 1 in which a commodity is stored by inserting the side wall 21b into the case 1, and inserting the case 1 into the blocking member 2, the blocking member 2 does not slide in the same manner as in the seventh embodiment.

Effect of the Invention

As described above, according to each of the commodity antitheft implements shown in the embodiments, the case in which the commodity is stored can be only difficultly opened unless the locking pawls are thrust inward to remove the blocking member. Therefore, possible theft in which only the commodity is taken away by opening the case can be prevented.

What is claimed is:

1. A commodity antitheft implement comprising: a blocking member which substantially encloses a case to prevent the case from being opened while being slidably fitted on the case; and a case having a locking pawl which is caught by the blocking member and is able to be thrust inwardly of the blocking member, wherein the blocking member is mounted to the case while being unable to slide by an engagement between the blocking member and the locking pawl of the case.

2. A commodity antitheft implement comprising: a blocking member which substantially encloses a case that stores therein a commodity to prevent the case from being opened while being slidably fitted on the case; and a slide preventing member which is caught by the blocking member, provided with a locking pawl capable of being the thrust inwardly of the blocking member, and mounted to the case in a sliding direction of the blocking member with respect to the case while being unable to slide with respect to the case.

3. A commodity antitheft implement as claimed in claim 1, wherein the locking pawl is caught by both side edges of the blocking member.

4. A commodity antitheft implement as claimed in claim 2, wherein the locking pawl is caught by both side edges of the blocking member.

5. A commodity antitheft implement as claimed in claim 1, wherein the blocking member is formed with a through hole in which the locking pawl of the case is to be caught.

6. A commodity antitheft implement as claimed in claim 2, wherein the blocking member is formed with a through hole in which the locking pawl of the case is to be caught.

7. A commodity antitheft implement as claimed in claim 5, wherein a plurality of through holes of the blocking member and a plurality of locking pawls of the case are provided.

8. A commodity antitheft implement as claimed in claim 1, and further comprising an unlocking tool which is provided for releasing the engagement by thrusting the locking pawl inward by being inserted into the blocking member.

* * * * *